United States Patent
Kato et al.

(10) Patent No.: US 11,443,540 B2
(45) Date of Patent: Sep. 13, 2022

(54) INFORMATION PROCESSING APPARATUS AND INFORMATION PROCESSING METHOD

(71) Applicant: SONY CORPORATION, Tokyo (JP)

(72) Inventors: Takaaki Kato, Tokyo (JP); Shunichi Homma, Tokyo (JP); Yuya Yamaguchi, Tokyo (JP); Masaki Fukuchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/964,589

(22) PCT Filed: Jan. 17, 2019

(86) PCT No.: PCT/JP2019/001223
§ 371 (c)(1),
(2) Date: Jul. 23, 2020

(87) PCT Pub. No.: WO2019/155840
PCT Pub. Date: Aug. 15, 2019

(65) Prior Publication Data
US 2021/0042513 A1  Feb. 11, 2021

(30) Foreign Application Priority Data

Feb. 7, 2018  (JP) .............................. JP2018-020137

(51) Int. Cl.
*G06V 40/10*  (2022.01)
(52) U.S. Cl.
CPC .................................. *G06V 40/103* (2022.01)
(58) Field of Classification Search
CPC ........... G06K 9/00369; G06K 9/00355; G06K 9/00919; G06K 9/00912; G06V 40/103;
(Continued)

(56) References Cited

U.S. PATENT DOCUMENTS

| 9,123,135 B2 * | 9/2015 | Ramanandan | .......... G06T 7/254 |
| 2010/0062854 A1 * | 3/2010 | Goto | ........................ G06F 3/033 463/36 |

(Continued)

FOREIGN PATENT DOCUMENTS

| CN | 104364823 A | 2/2015 |
| CN | 108463840 A | 8/2018 |

(Continued)

OTHER PUBLICATIONS

International Search Report and Written Opinion of PCT Application No. PCT/JP2019/001223, dated Mar. 26, 2019, 09 pages of ISRWO.

*Primary Examiner* — Md K Talukder
(74) *Attorney, Agent, or Firm* — Chip Law Group

(57) ABSTRACT

There is provided an information processing apparatus and an information processing method capable of performing position estimation of a controller corresponding to a wearable device having an inside-out type. The information processing apparatus includes a user-position estimating unit that recognizes, based on a first captured image that is captured by a first image capturing unit provided to a wearable device mounted on a user, peripheral environment information of the user to execute position estimation of the user in a real space and a controller-position estimating unit that executes, based on a second captured image captured by a second image capturing unit that is provided to a controller being operated by the user, position estimation of the controller with reference to the recognized environment information.

16 Claims, 9 Drawing Sheets

(58) Field of Classification Search
CPC ....... G06V 20/10; G06F 3/011; G06F 3/0346;
G06T 7/70; G06T 17/05; G01C 21/26
See application file for complete search history.

(56) References Cited

U.S. PATENT DOCUMENTS

| | | | | |
|---|---|---|---|---|
| 2011/0222745 | A1* | 9/2011 | Osterhout | G06F 1/1673 |
| | | | | 382/117 |
| 2015/0352437 | A1* | 12/2015 | Koseki | A63F 13/5255 |
| | | | | 463/31 |
| 2016/0364013 | A1* | 12/2016 | Katz | G06F 3/011 |
| 2017/0076491 | A1* | 3/2017 | Jiang | G06T 15/205 |
| 2017/0336862 | A1* | 11/2017 | Xu | G06T 11/60 |
| 2017/0352184 | A1* | 12/2017 | Poulos | G06F 3/017 |
| 2018/0131926 | A1* | 5/2018 | Shanks | G02B 27/0172 |
| 2018/0341386 | A1* | 11/2018 | Inomata | G02B 27/0093 |
| 2020/0400954 | A1* | 12/2020 | Tanaka | G06T 19/006 |
| 2021/0042513 | A1* | 2/2021 | Kato | G06F 3/0346 |

FOREIGN PATENT DOCUMENTS

| | | | |
|---|---|---|---|
| CN | 109074149 | A | 12/2018 |
| EP | 3407302 | A1 | 11/2018 |
| JP | 2007-244534 | A | 9/2007 |
| JP | 2015-528936 | A | 10/2015 |
| JP | 2015-232783 | A | 12/2015 |
| JP | 2017-058752 | A | 3/2017 |
| JP | 2017-129904 | A | 7/2017 |
| KR | 10-2015-0023720 | A | 3/2015 |
| WO | 2013/188308 | A1 | 12/2013 |
| WO | 2017/126172 | A1 | 7/2017 |
| WO | 2017/200580 | A1 | 11/2017 |
| WO | 2017/213862 | A1 | 12/2017 |

\* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/001223 filed on Jan. 17, 2019, which claims priority benefit of Japanese Patent Application No. JP 2018-020137 filed in the Japan Patent Office on Feb. 7, 2018. Each of the above-referenced applications is hereby incorporated herein by reference in its entirety.

FIELD

The present disclosure relates an information processing apparatus, an information processing method, and a program.

BACKGROUND

Recently, there has been developed a technology for enjoying, by using a display mounted on a head and having a structure shutting off the outside world, namely, a Head Mounted Display (HMD), Virtual Reality (VR) for relishing sense of immersion into a virtual space, or a technology for enjoying, by using a see-through HMD whose display of the HMD has a transparent type, Virtual Reality (AR) obtained by superposing and displaying a virtual image on the outside world viewed through the display.

Peculiarly, in a case of VR, in order to more increase sense of immersion into a virtual space, it is important to more precisely track a movement of a user in a real space. With respect to a position and a posture of a user in a real space, there has been known an outside-in type for capturing and tracking, by using a peripheral external camera, a marker provided to an HMD mounted on the user, for example.

On the other hand, the following Patent Literature 1 is exemplified as a technology related to a controller to be commonly operated by a user, for example. The following Patent Literature 1 discloses a game system configured to capture, by using an external camera provided to a non-portable-type display, a user performing an operation on a controller while facing the display; acquire a position of an LED of the controller in a captured image; and reflects acquired position information in a process of game application.

CITATION LIST

Patent Literature

Patent Literature 1: JP 2007-244534 A

SUMMARY

Technical Problem

Incidentally, as described above, with respect to a recent position estimation of a user wearing an HMD, the tracking with the use of an external camera is cardinal, and a controller to be used therewith presupposes the tracking with the use of the external camera. In other words, for example, a light emitting unit is provided to a controller, and the light emitting unit of the controller is recognized by using an external camera so as to perform position estimation.

However, position estimation of a user wearing an HMD is not limited to an outside-in type, and may be realized by an inside-out type using a camera provided to an HMD, which does not need an external camera; on the other hand, a controller presupposing a system having such a type is not sufficiently developed.

Therefore, in the present disclosure, there are proposed an information processing apparatus, an information processing method, and a program capable of performing position estimation of a controller corresponding to a wearable device having an inside-out type.

Solution to Problem

According to the present disclosure, an information processing apparatus is provided that includes: a user-position estimating unit that recognizes, based on a first captured image that is captured by a first image capturing unit provided to a wearable device mounted on a user, peripheral environment information of the user to execute position estimation of the user in a real space; and a controller-position estimating unit that executes, based on a second captured image captured by a second image capturing unit that is provided to a controller being operated by the user, position estimation of the controller with reference to the recognized environment information.

According to the present disclosure, an information processing method is provided that allows a processor to execute the following steps: recognizing, based on a first captured image that is captured by a first image capturing unit provided to a wearable device mounted on a user, peripheral environment information of the user to execute position estimation of the user in a real space; and executing, based on a second captured image captured by a second image capturing unit that is provided to a controller being operated by the user, position estimation of the controller with reference to the recognized environment information.

According to the present disclosure, a program is provided that allows a computer to function as: a user-position estimating unit that recognizes, based on a first captured image that is captured by a first image capturing unit provided to a wearable device mounted on a user, peripheral environment information of the user to execute position estimation of the user in a real space; and a controller-position estimating unit that executes, based on a second captured image captured by a second image capturing unit that is provided to a controller being operated by the user, position estimation of the controller with reference to the recognized environment information.

Advantageous Effects of Invention

As described above, according to the present disclosure, it is possible to perform position estimation of a controller corresponding to a wearable device having an inside-out type.

The above-described effects are not necessarily limited, and any effects indicated in the present specification or other effects that can be understood from the present specification may be exerted together with or instead of the above-described effects.

DESCRIPTION OF EMBODIMENTS

The following describes preferable embodiments of the present disclosure in detail with reference to the attached drawings. In the present specification and the drawings, overlap of descriptions will be avoided by providing the same reference symbols for constituent elements having substantially the same functional configuration.

Descriptions will be constituted in the following order.
1. Outline of Information Processing System According to One Embodiment of Present Disclosure
2. Configurations
2-1. Configuration of HMD
2-2. Configuration of Controller
3. Embodiments
3-1. First Embodiment
3-2. Second Embodiment
3-3. Third Embodiment
3-4. Fourth Embodiment
4. Supplement
5. Conclusion

1. OUTLINE OF INFORMATION PROCESSING SYSTEM ACCORDING TO ONE EMBODIMENT OF PRESENT DISCLOSURE

Figure 1:
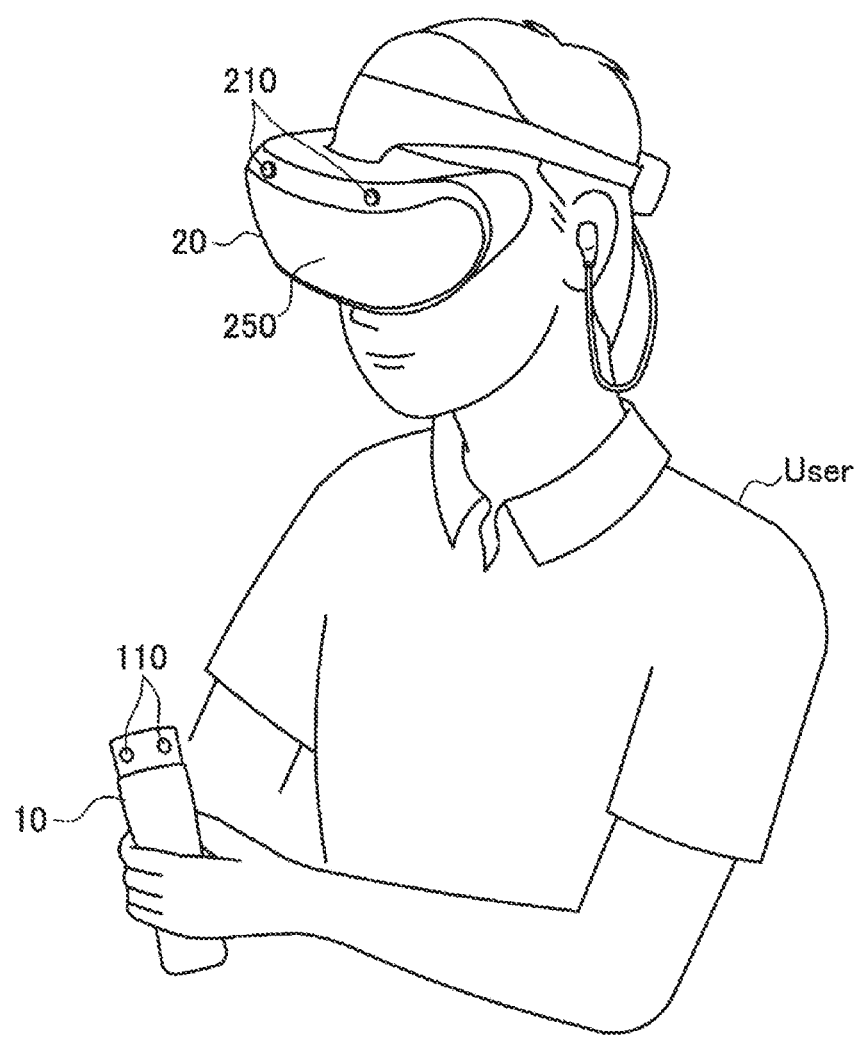
FIG. 1 is a diagram illustrating the outline of an information processing system according to one embodiment of the present disclosure.

FIG. 1 is a diagram illustrating the outline of an information processing system according to one embodiment of the present disclosure. As illustrated in FIG. 1, the information processing system according to the present embodiment includes an HMD 20 mounted on a head of a user and a controller 10 to be operated by the user.

As illustrated in FIG. 1, the HMD 20 is mounted on a head of a user, and when the HMD 20 is mounted, a display (display 250) is arranged before eyes of the user. The display 250 may have a transparent type or a non-transparent type. A content image such as an image of a virtual space may be displayed on the display 250. The image of a virtual space may be a 3D-image. The HMD 20 may further include earphones (sound outputting unit 260). In the example illustrated in FIG. 1, a pair of earphones is illustrated as one example of the sound outputting unit 260 provided to the HMD 20; however, the present embodiment is not limited thereto and the sound outputting unit 260 may be headphones or open-type earphones, for example. Information on the outside world is shut off and an image and sound of a virtual space are presented by using the display having a non-transparent type, the earphones, and the like so as to more increase sense of immersion into the virtual space.

An inside-out type is employed for the HMD 20 according to the present embodiment as a method for position tracking, and thus a plurality of cameras 210 for capturing the outside world is provided to the HMD 20. The number and arrangement of the cameras 210 are not peculiarly limited. The HMD 20 is capable of analyzing captured images that are captured by the cameras 210 so as to recognize peripheral environment information (generation of environment map), and is further capable of self-position estimation, in other words, estimating a position (head position) of a user wearing the HMD 20. Therefore, an external camera (environment-side camera) is unnecessary, so that a user is able to freely move around without considering a limit of a range of his/her behavior.

As described above, conventionally, there has not been sufficiently developed a controller to be used while combining therewith the HMD 20 that presupposes such an inside-out type. In other words, as the controller to be used while combining therewith the HMD 20, there has been used a type to recognize a position of an LED of a controller while presupposing an external camera, for example. There may be considered a type to recognize a position (relative position) of an LED of a controller by using a camera provided to the HMD 20 as an external camera; however, in this case, the controller is needed to be within angle of view of the camera provided to the HMD 20, and thus recognition of movement outside of the angle of view is difficult when a user drops down the controller, for example.

Thus, in the present disclosure, there is proposed the controller 10 to be used while combining therewith the HMD 20 that presupposes an inside-out type.

The controller 10 according to the present embodiment is provided with one or more cameras 110 configured to capture the periphery. The number and arrangement of the camera(s) are not peculiarly limited. The controller 10 transmits, to the HMD 20, a captured image captured by the camera(s) 110 in a wireless/wired manner.

Next, the HMD 20 estimates a position and a posture of the controller 10 by using an environment map generated on the basis of the captured image received from the controller 10 and. As described above, in the present embodiment, position estimation of a controller corresponding to the HMD 20 having an inside-out type is able to be performed without requiring an external camera.

As described above, the outline of the HMD 20 and the controller 10 according to the present embodiment has been explained. Note that exterior shapes of the HMD 20 and the controller 10 illustrated in FIG. 1 are merely examples and the present embodiment is not limited thereto. It is sufficient that the HMD 20 is formed by a mounting unit that is generally called an eyeglass type or a head-mounting type, and as at least the present embodiment, it is sufficient that the display 250 is arranged in front of and close to eyes of a user. The display 250 may have a configuration in which the single display 250 is provided to correspond to one eye in addition to the case where a pair of the displays 250 is arranged to correspond to both eyes.

The HMD 20 is one example of a head mounted display; however, the present embodiment is not limited thereto, and there may be employed a system configuration including the controller 10 and a wearable device (including device without display) having a user-wearable type to which at least the camera(s) 210 for capturing the outside world is provided.

2. CONFIGURATION EXAMPLE

Figure 2:
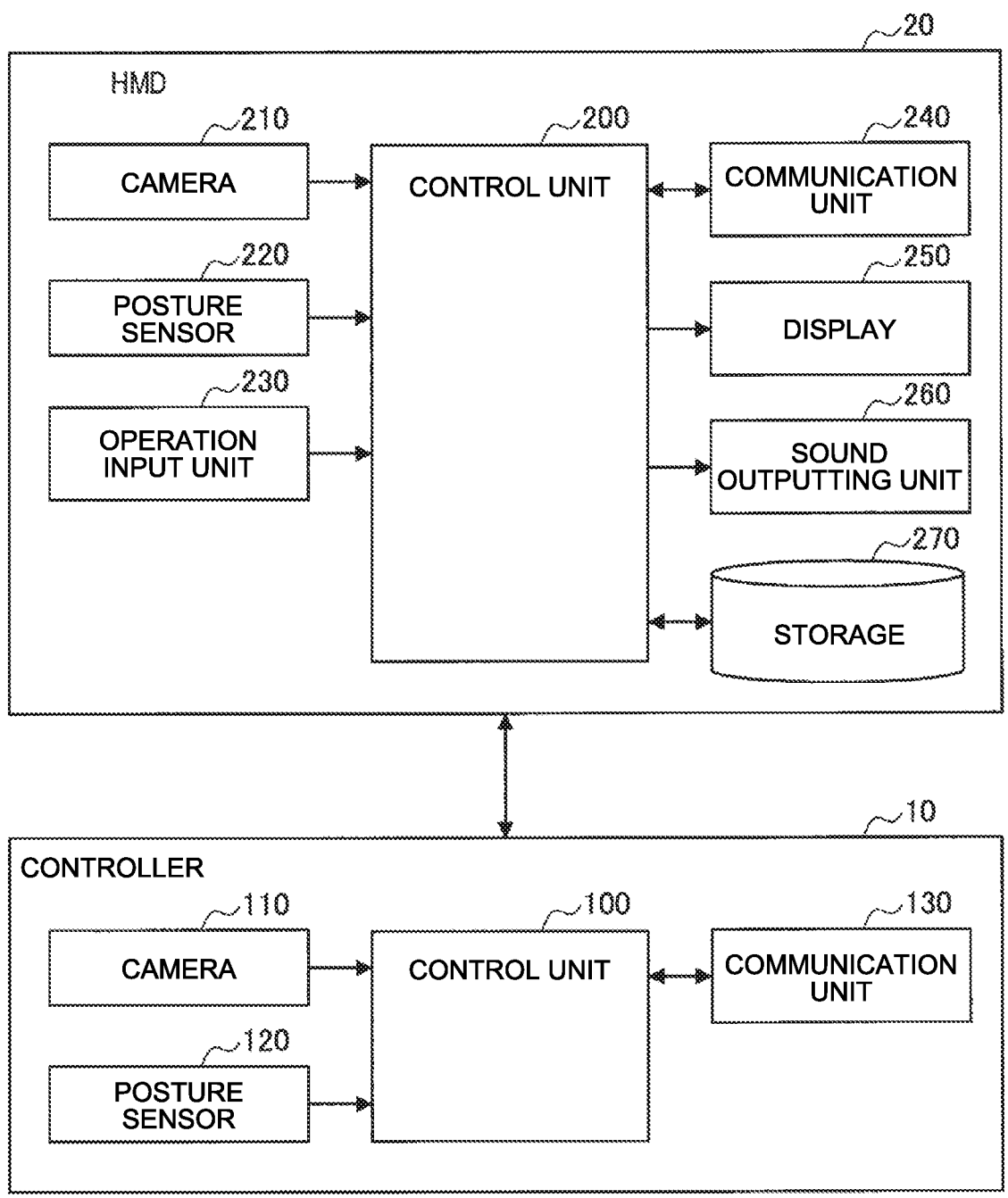
FIG. 2 is a block diagram illustrating basic internal configuration examples of an HMD and a controller according to the present embodiment.

Next, a basic inner configuration of the present system will be specifically explained with reference to FIG. 2. FIG. 2 is a block diagram illustrating basic internal configuration examples of the HMD 20 and the controller 10 according to the present embodiment. Hereinafter, they will be sequentially explained.

<2-1. Configuration of HMD>

As illustrated in FIG. 2, the HMD 20 according to the present embodiment includes a control unit 200, the cameras 210, a posture sensor 220, an operation input unit 230, a communication unit 240, the display 250, the sound outputting unit 260, and a storage 270.

The control unit 200 functions as a calculation processing device and a controller so as to control all operations of the HMD 20 in accordance with various programs. The control unit 200 is realized by electronic circuits such as a Central Processing Unit (CPU) and a microprocessor. The control unit 200 may include a Read Only Memory (ROM) storing therein, for example, a program and a calculation parameter that are to be used, and may include a Random Access Memory (RAM) temporarily storing therein, for example, a parameter that is appropriately changed.

A specific functional configuration of the control unit 200 according to the present embodiment will be mentioned later by using the plurality of embodiments.

Each of the cameras 210 includes a lens system constituted of an image capturing lens, a diaphragm, a zoom lens, a focus lens, and the like; a drive system that causes the lens system to execute a focusing operation and a zoom operation; a solid-state image capturing element array that executes photoelectric conversion on captured light obtained by the lens system to generate a captured image signal; and the like. The solid-state image capturing element array may be realized by a Charge Coupled Device (CCD) sensor array, or a Complementary Metal Oxide Semiconductor (CMOS) sensor array, for example. The cameras 210 may have a moving type. A configuration of the camera 210 may be combined with, for example, a depth sensor capable of acquiring depth information by using a captured image, an infrared ray, and the like.

The posture sensor 220 has a function for detecting a posture (including orientation of head) of a user wearing the HMD 20. For example, the posture sensor 220 is realized by an inertial measurement unit (IMU) that detects angles (or angular speeds) of three axes and the acceleration. Or the posture sensor 220 may be a 9-axis sensor including a 3-axis gyro sensor {for detecting angular speed (rotation speed)}, a 3-axis acceleration sensor (for detecting acceleration during movement, and may be referred to as G sensor), and a 3-axis geomagnetic sensor {for detecting absolute directions (azimuth directions), and may be referred to as compass}. Note that these are examples of the posture sensor 220, and either of an acceleration sensor and a gyro sensor may be employed for the posture sensor 220, for example.

The operation input unit 230 receives an operation instruction from a user, and outputs, to the control unit 200, an operation content in response thereto. The operation input unit 230 may be a touch sensor, a pressure sensor, or a proximity sensor. Or the operation input unit 230 may have a physical configuration such as a button, a switch, and a lever.

The communication unit 240 is communicably connected to an external device in a wired or wireless manner so as to transmit and receive data. For example, the communication unit 240 is communicably connected to a network and/or a peripheral device (for example, controller 10) by using a wired/wireless Local Area Network (LAN), Wi-Fi (Registered Trademark), Bluetooth (Registered Trademark), infrared communication, short-range wireless communication, a portable communication network {Long Term Evolution (LTE) or third-generation mobile communication system (3G)}, etc.

For example, the communication unit 240 receives, from the controller 10, a captured image and posture-sensor information.

The display 250 is constituted of a display such as a Liquid Crystal Display (LCD) and an Electro Luminescence display. The display 250 may have a transparent type or a non-transparent type. Or the transmittance of the display 250 may be controlled by the control unit 200.

The sound outputting unit 260 includes a speaker that reproduces a sound signal and an amplifier circuit for the speaker.

The storage 270 is realized by a Read Only Memory (ROM) storing therein a program and a calculation parameter to be used in processing of the control unit 200, for example, and a Random Access Memory (RAM) temporarily storing therein a parameter to be appropriately changed, for example.

As described above, a basic internal configuration example of the HMD 20 has been explained. A configuration of the HMD 20 is not limited the example illustrated in FIG. 2, and may further include a sound inputting unit (microphone), for example.

<2-2. Configuration of Controller>

As illustrated in FIG. 2, the controller 10 according to the present embodiment includes a control unit 100, the cameras 110, a posture sensor 120, and a communication unit 130.

The control unit 100 functions as a calculation processing device and a controller so as to control all operations of the controller 10 in accordance with various programs. The control unit 100 is realized by an electronic circuit such as a Central Processing Unit (CPU) and a microprocessor. The control unit 100 may include a Read Only Memory (ROM) storing therein a program and a calculation parameter to be used, for example, and a Random Access Memory (RAM) temporarily storing therein a parameter to be appropriately changed, for example.

Each of the cameras 110 includes a lens system constituted of an image capturing lens, a diaphragm, a zoom lens, a focus lens, and the like; a drive system that causes the lens system to execute a focusing operation and a zoom operation; a solid-state image capturing element array that executes photoelectric conversion on captured light obtained by the lens system to generate a captured image signal; and the like. The solid-state image capturing element array may be realized by a Charge Coupled Device (CCD) sensor array, or a Complementary Metal Oxide Semiconductor (CMOS) sensor array, for example. The cameras 110 may have a moving type. The number and arrangement of the cameras 110 are not peculiarly limited. The numbers of the cameras 110 may be one or more. When the plurality of cameras 110 is employed, each of the cameras 110 may individually operate, or the cameras 110 may operate in cooperation with each other.

The posture sensor 120 has a function for detecting a posture (including orientation) of the controller 10. For example, the posture sensor 120 is realized by an inertial measurement unit (IMU) that detects angles (or angular speeds) of three axes and the acceleration. Or the posture sensor 120 may be a 9-axis sensor including a 3-axis gyro sensor {for detecting angular speed (rotation speed)}, a 3-axis acceleration sensor (for detecting acceleration during movement, and may be referred to as G sensor), and a 3-axis geomagnetic sensor {for detecting absolute directions (azimuth directions), and may be referred to as compass}. Note that these are examples of the posture sensor 120, and either of an acceleration sensor and a gyro sensor may be employed for the posture sensor 120, for example.

The communication unit 130 is communicably connected to an external device in a wired or wireless manner so as to transmit and receive data. For example, the communication unit 130 is communicably connected to a peripheral device (for example, HMD 20) by using a wired/wireless Local Area Network (LAN), Wi-Fi (Registered Trademark), Bluetooth (Registered Trademark), infrared communication, short-range wireless communication, etc.

For example, the communication unit 130 transmits, to the HMD 20, a captured peripheral image captured by the cameras 110 and posture-sensor information detected by the posture sensor 120.

As described above, the basic internal configuration example of the controller 10 has been explained. A configuration of the controller 10 is not limited to the example illustrated in FIG. 2, and may further include, for example, a sound inputting unit (microphone), a vibrator, a light emitting unit, a speaker, etc. Although not illustrated, the controller 10 may be provided with an operation input unit such as a button and a switch.

3. EMBODIMENTS

Next, information processing systems according to the present embodiment will be specifically explained by using the plurality of embodiments.

3-1. First Embodiment

In the first embodiment, the HMD 20 is configured to execute position tracking of an inside-out type, namely, environment recognition with the use of captured images captured by the cameras 210 provided to the HMD 20 so as to perform position estimation (self-position estimation) of the HMD 20, and is further configured to perform, with reference to result of the environment recognition, position estimation of the controller 10 with the use of a captured image captured by the controller 10. Thus, an external camera is not required in the position estimation, a user is accordingly able to freely move, and thus the cameras of the HMD 20 have no need to display thereon the controller 10 or his/her hand. Moreover, a recognition target is whole of the environment, and thus the system has no need to preliminary learn a specific shape. When the processor of the HMD 20 side has sufficient operation ability, it is possible to realize an inexpensive controller.

(3-1-1. Configuration)

Figure 3:
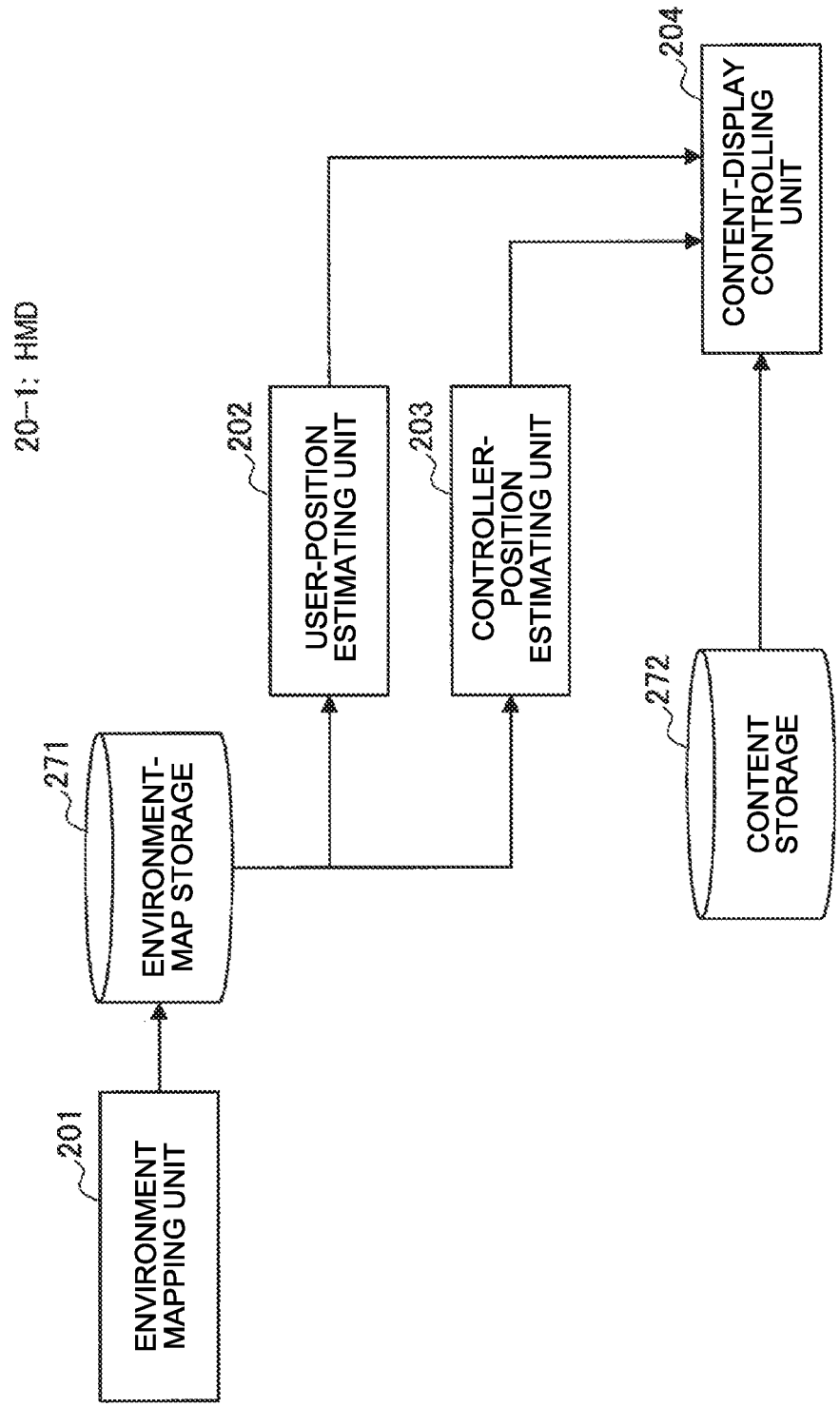
FIG. 3 is a block diagram illustrating one example of a functional configuration of an HMD according to a first embodiment.

FIG. 3 is a block diagram illustrating one example of a functional configuration of an HMD 20-1 according to the present embodiment. As illustrated in FIG. 3, the HMD 20-1 functions as an environment mapping unit 201, a user-position estimating unit 202, a controller-position estimating unit 203, and a content-display controlling unit 204.

The HMD 20-1 according to the present embodiment may employ, as a method for self-position estimation, a so-called simultaneous localization and mapping (SLAM) capable of simultaneously executing self-position estimation and map construction. Algorithm of the SLAM is not peculiarly described here, for example, there may be employed Landmark based SLAM using a landmark that is expressed by a point coordinate on a map. In the Landmark based SLAM, a feature object is recognized as a landmark so as to generate a map of the landmark. Feedback is given to self-position estimation by using coordinate information of the landmark. Hereinafter, functional configurations will be specifically explained.

The environment mapping unit 201 executes, on the basis of captured peripheral images captured by the cameras 210 of the HMD 20-1, recognition (object recognition) of peripheral environment so as to generate an environment map. For example, the environment mapping unit 201 analyzes the captured images to estimate a 3D-landmark based on feature information (distance information is calculated based on principle of triangulation). The generated environment map is accumulated in an environment-map storage 271. Furthermore, the environment mapping unit 201 may refer to posture-sensor information detected by the posture sensor 220 in generating an environment map. Moreover, the environment mapping unit 201 may generate an environment map by using captured images captured by the cameras 110 of the controller 10. Thus, it is possible to acquire an image (environment information) of an angle and/or a height that is not able to be obtained by the cameras 210 of the HMD 20 alone.

The user-position estimating unit 202 estimates a self-position of the HMD 20-1, namely, a position and a posture of a user (head) wearing the HMD 20-1 (position tracking and head tracking). As described above, the position estimation may be performed by using SLAM, for example. For example, the user-position estimating unit 202 may analyze captured images captured by the cameras 210 to execute tracking on a feature point, and may further estimate, with reference to the above-mentioned generated environment map, a position and a posture on the basis of a 3D-landmark and 2D-information obtained by the tracking. Note that a SLAM technology here employed is not limited to a feature point tracking (tracking of discrete feature point), and a SLAM technology other than the feature point tracking may be employed. For example, self-position estimation and map construction may be performed on the basis of tracking of an edge point (point on edge extracted from image) and/or point cloud acquired from a depth sensor. Moreover, the user-position estimating unit 202 may be configured to estimate a position and a posture of a user with reference to posture-sensor information detected by the posture sensor 220.

The controller-position estimating unit 203 estimates a position and a posture of the controller 10 being operated by a user. Specifically, the controller-position estimating unit 203 may analyze captured images captured by the cameras 110 provided to the controller 10 so as to execute tracking on a feature point, and may further estimate, with reference to the above-mentioned generated environment map, a position and a posture of the controller 10 on the basis of a 3D-landmark and 2D-information obtained by the tracking. Note that the controller-position estimating unit 203 may be configured to estimate a position and a posture of the controller 10 with reference to posture-sensor information detected by the posture sensor 120 provided to the controller 10.

The controller-position estimating unit 203 according to the present embodiment is capable of estimating a controller position on the basis of an assumption that the controller 10 is gripped by a user (controller is not much separated from head). For example, in accordance with an orientation of the HMD 20, the controller-position estimating unit 203 may narrows down a candidate point in executing controller-position estimation. Moreover, the controller-position estimating unit 203 is capable of estimating, by using SLAM, a controller position on the basis of both of an image and posture-sensor data, and in this case, is further capable of estimating, by using image information, a bias of the controller.

The content-display controlling unit 204 executes control such that the content-display controlling unit 204 generates an image on the basis of a content of a virtual space which is acquired from a content storage 272, and displays the generated image on the display 250 of the HMD 20. The content of a virtual space to be provided to a user includes an omnidirectional content, a free-viewpoint content, a game content, or the like. The free-viewpoint content is a content obtained by generating, by using images captured by a plurality of cameras, an image in a case where a virtual camera is arranged at an arbitrary position to be able to view an image viewed from any of all viewpoints. The term of "virtual space" used in the present specification indicates an expression of a real or a virtual environment having a rule of interaction to be simulated by one or more processors to be felt by an actual user via one or more displays and/or with which the real user interacts via one or more user interfaces. The term of "user interface" used in the present specification indicates an actual device (for example, HMD 20) by using which a user is able to transmit an input to a virtual world and further to receive an output from the virtual world. In a virtual space, a user may be expressed by using an avatar, or a world of the virtual space viewed from a view point of the avatar may be displayed without displaying the avatar on the display. In the present specification, a view point of a user (or avatar) in a virtual space is able to be regarded as a view of a virtual camera. The "virtual camera" used in the present specification indicates a view point in a virtual space that is used for drawing a 2D-image of a 3D-scene in the virtual space.

In accordance with a movement of a user in the vertical and/or the horizontal direction in an actual space and his/her posture (orientation of head, etc.), the content-display controlling unit 204 according to the present embodiment makes, in a virtual space, a movement having the same movement amount in the vertical and/or the horizontal direction, and takes correspondence to the posture (orientation of head) so as to provide a VR experience whose sense of immersion is high. More specifically, in accordance with a real-time position and a real-time posture of a user (head), which are estimated by the user-position estimating unit 202, the content-display controlling unit 204 generates an image of a virtual space to display the generated image on the display 250.

The content-display controlling unit 204 is capable of acquiring intent of a user from the controller 10 to reflect the intent of the user on the image. There is supposed a case where a virtual object corresponding to the controller 10 appears in a view of a user in a virtual space. The content-display controlling unit 204 generates an image in accordance with a real-time position and a real-time posture of the controller 10, which are estimated by the controller-position estimating unit 203, and thus a movement of the controller 10 in an actual space is reflected on a virtual space in real time to be able to further increase sense of immersion. As the display control corresponding to the controller 10, decision of a position of an object in a game, instruction for the next movement of hand, and switching of the display 250 into a see-through view are exemplified.

(3-1-2. Operation Process)

Figure 4:
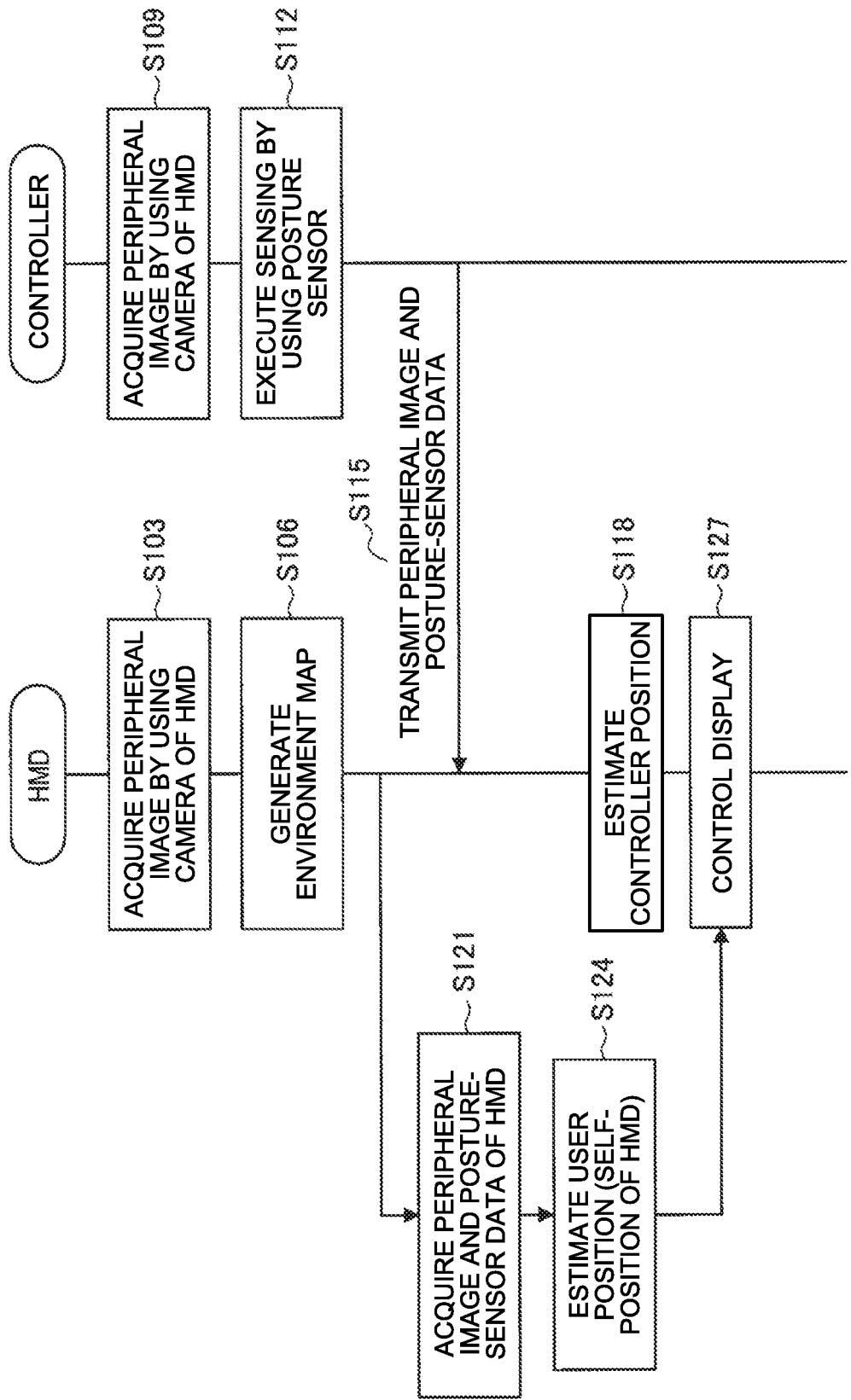
FIG. 4 is a sequence diagram illustrating one example of a control flow of an information processing system according to the first embodiment.

FIG. 4 is a sequence diagram illustrating one example of a control flow of an information processing system according to the present embodiment. As illustrated in FIG. 4, first, the HMD 20 acquires (captures) peripheral images by using the cameras 210 of the HMD 20 (Step S103), and causes the environment mapping unit 201 to generate an environment map (Step S106). The generated environment map is stored in the environment-map storage 271.

Next, the controller 10 acquires (captures) peripheral images by using the cameras 110 of the controller 10 (Step S109), and further executes sensing by using a posture sensor (Step S112).

Next, the controller 10 transmits, to the HMD 20, the peripheral images (captured images) and posture-sensor data (Step S115).

On the other hand, the HMD 20 acquires the peripheral images of the HMD 20 from the cameras 210 and the posture-sensor data from the posture sensor 220 (Step S121), and estimates, by using the environment map, a user position (namely, self-position of HMD 20) (Step S124).

The HMD 20 estimates a controller position on the basis of the peripheral images (captured images) and the posture-sensor data that are received from the controller 10.

The HMD 20 generates, on the basis of an estimation result of the user position and the controller position, an image of a virtual-space content to be displayed on the display 250 of the HMD 20 (Step S127).

As described above, the operation process according to the present embodiment has been specifically explained.

3-2. Second Embodiment

Next, the second embodiment according to the present embodiment will be explained with reference to FIGS. 5 and 6. In the present embodiment, an estimated user position and an estimated control position are corrected by using the newest posture-sensor data to be able to prevent a delay.

(3-2-1. Configuration)

Figure 5:
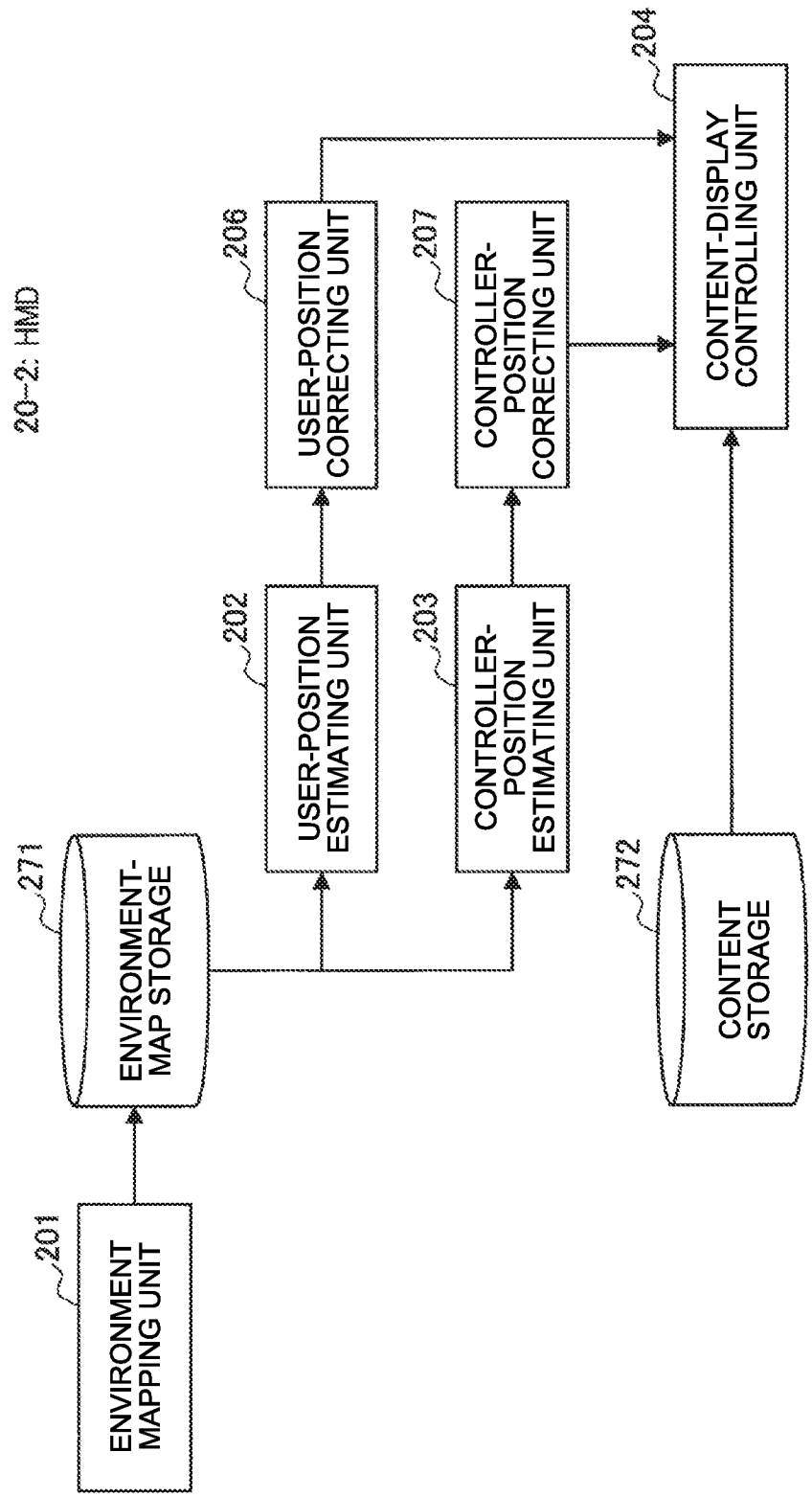
FIG. 5 is a block diagram illustrating one example of a functional configuration of an HMD according to a second embodiment.

FIG. 5 is a block diagram illustrating one example of a functional configuration of an HMD 20-2 according to the second embodiment. As illustrated in FIG. 5, the HMD 20-2 functions as the environment mapping unit 201, the user-position estimating unit 202, the controller-position estimating unit 203, a user-position correcting unit 206, a controller-position correcting unit 207, and the content-display controlling unit 204. Detailed explanation of configurations, represented with reference symbols same as those according to the first embodiment, is omitted.

For a user position estimated by the user-position estimating unit 202, the user-position correcting unit 206 may correct the user position on the basis of the newest posture-sensor data acquired by the posture sensor 220 after acquisition of captured images and posture-sensor data that are used for estimating the user position.

For a controller position estimated by the controller-position estimating unit 203, the controller-position correcting unit 207 may correct the controller position on the basis of the newest posture-sensor data acquired by the posture sensor 120 after acquisition of captured images and posture-sensor data that are used for estimating the controller position.

(3-2-2. Operation Process)

Figure 6:
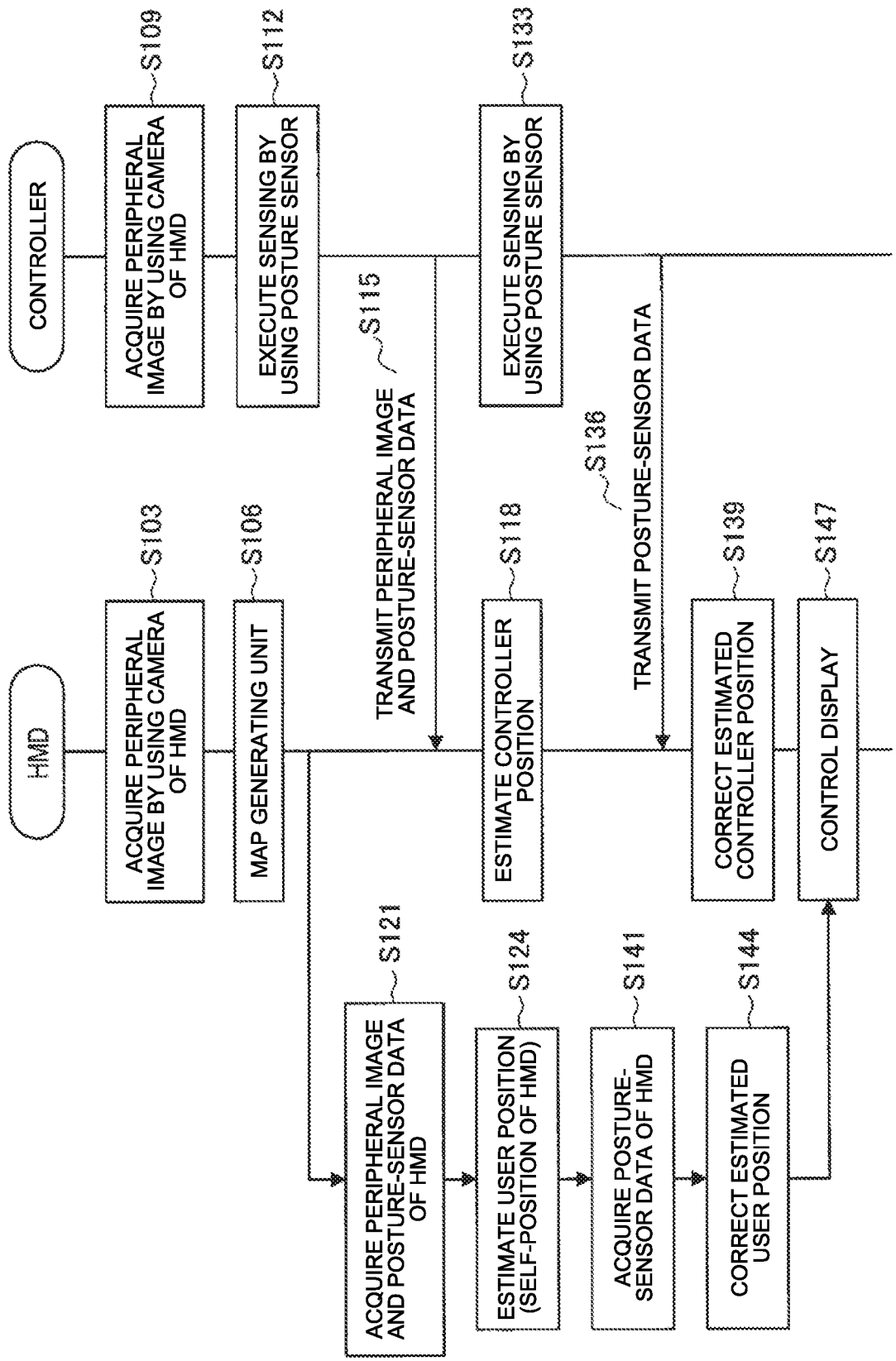
FIG. 6 is a sequence diagram illustrating one example of a control flow of an information processing system according to the second embodiment.

FIG. 6 is a sequence diagram illustrating one example of a control flow of an information processing system according to the present embodiment. Steps S103 to S124 illustrated in FIG. 6 are similar to the processes represented with the same reference symbols, which have been already explained with reference to FIG. 4, and the HMD 20 may execute user-position estimation and controller-position estimation on the basis of each of peripheral images and posture-sensor data.

Next, the controller 10 performs sensing by using a posture sensor (Step S133), and transmits posture-sensor data to the HMD 20 (Step S136).

Next, the HMD 20 corrects the estimated controller position on the basis of the newest posture-sensor data (Step S139).

The HMD 20 similarly performs correction with respect to a user position. In other words, when acquiring posture-sensor data of the HMD by using the posture sensor 220 (Step S141), the HMD 20 corrects the estimated user position (Step S144).

The HMD 20 generates, on the basis of correction result of the controller position and the user position, an image of a virtual-space content to be displayed on the display 250 of the HMD 20 (Step S147).

As described above, the operation process according to the present embodiment have been specifically explained.

3-3. Third Embodiment

Next, the third embodiment according to the present embodiment will be specifically explained with reference to FIGS. 7 and 8. In the above-mentioned embodiments, selection of data to be transmitted from the controller 10 to the HMD 20 and the like has not been peculiarly described; however, the controller 10 is capable of controlling, in accordance with a predetermined condition, data to be transmitted to the HMD 20.

Figure 7:
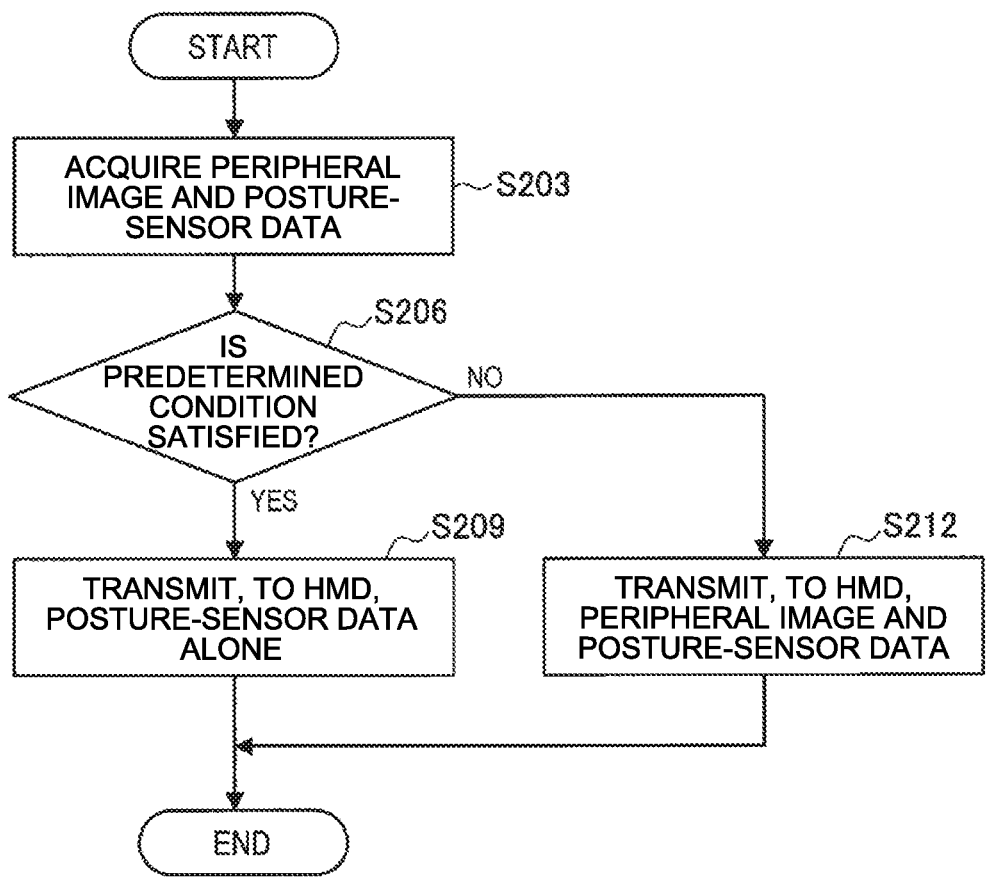
FIG. 7 is a flowchart illustrating one example of data transmitting control of a controller according to a third embodiment.

FIG. 7 is a flowchart illustrating one example of data transmitting control of the controller 10 according to the present embodiment.

As illustrated in FIG. 7, the controller 10 acquires peripheral images and posture-sensor data (Step S203).

Next, the controller 10 determines whether or not a predetermined condition is satisfied (Step S206).

Next, when the predetermined condition is satisfied (Step S206: Yes), the controller 10 transmits, to the HMD 20, posture-sensor data alone (Step S209).

On the other hand, when the predetermined condition is not satisfied (Step S206: No), the controller 10 transmits, to the HMD 20, peripheral images and posture-sensor data (Step S212).

Herein, as the "predetermined condition", the following conditions are supposed, for example. In a case where the condition is satisfied, peripheral images are not able to be sufficiently used for position estimation even when the peripheral images are transmitted, and thus the controller 10 transmits the posture-sensor data alone.

Is a movement fast?
Is a screen dark?
Is the number of feature points small?
Is a flow of a screen large?
Gripped by a human? (Is a part of the cameras 110 gripped?)
Is a distance to an object close? (Are the cameras 110 too close to an object?)

The controller 10 according to the present embodiment is further capable of transmitting the following data, and may be configured to appropriately execute transmission control depending on a situation.

RGB image
RGBD image
Feature point
Depth information
Exposure, Gain
IMU acceleration, Angular speed, Temperature, etc.
Recognition result of face, human, etc.

On the other hand, one example of a position estimating process on the HMD 20 side according to the information transmitted from the controller 10 as described above will be explained with reference to FIG. 8.

Figure 8:
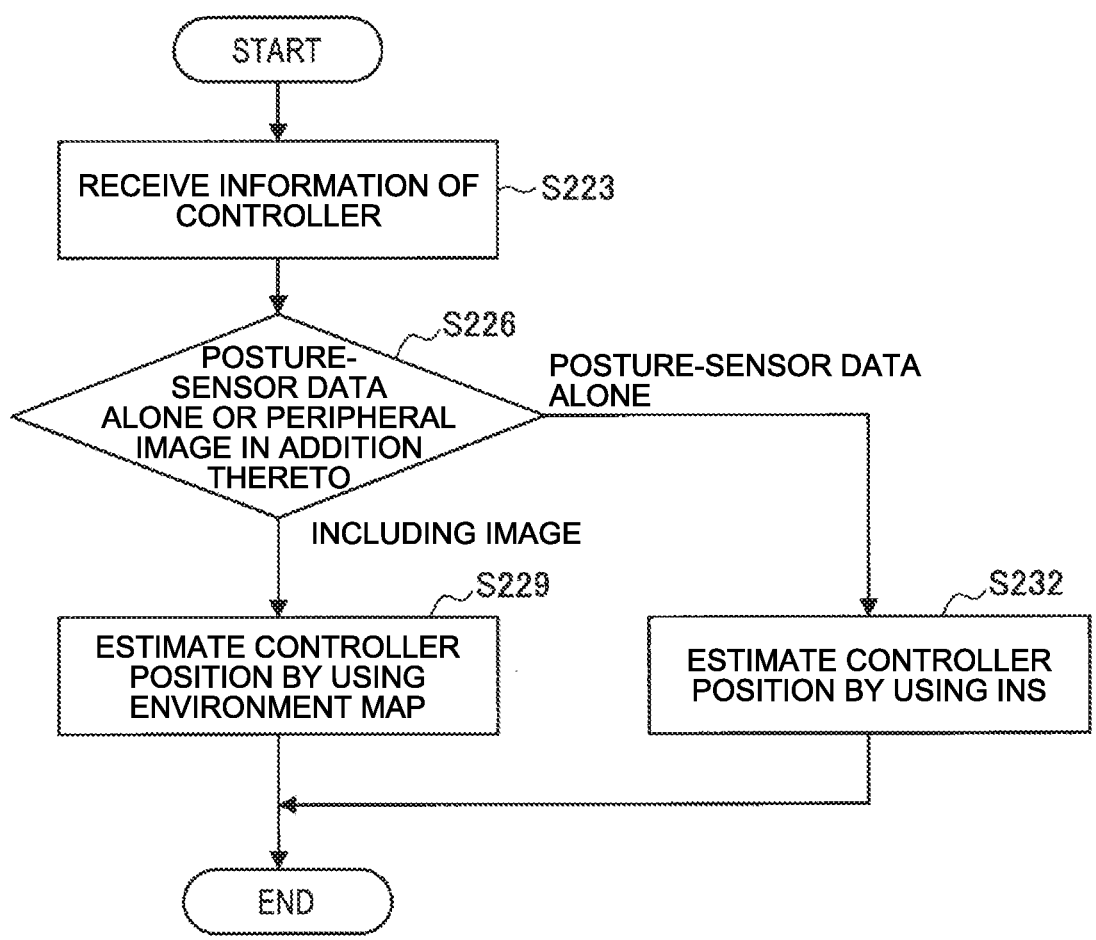
FIG. 8 is a flowchart illustrating one example of a position estimating process of an HMD according to the third embodiment.

FIG. 8 is a flowchart illustrating one example of a position estimating process of the HMD 20 according to the present embodiment. As illustrated in FIG. 8, when receiving information from the controller 10 (Step S223), the HMD 20 determines whether the information includes posture-sensor data alone or peripheral images in addition thereto (Step S226).

Next, when the information includes peripheral images (Step S226: including image), as described above, the HMD 20 estimates a controller position by using an environment map (Step S229). When the information includes peripheral images, the HMD 20 may update the environment map on the basis of new peripheral images.

On the other hand, when the information includes posture-sensor data alone (Step S226: gaze-sensor data alone), the HMD 20 is capable of estimating a controller position by using an Inertial Navigation System (INS), for example.

3-4. Fourth Embodiment

Furthermore, the controller 10 according to the present embodiment may perform a predetermined operation control according to information received from the HMD 20. Hereinafter, this point will be specifically explained with reference to FIG. 9.

Figure 9:
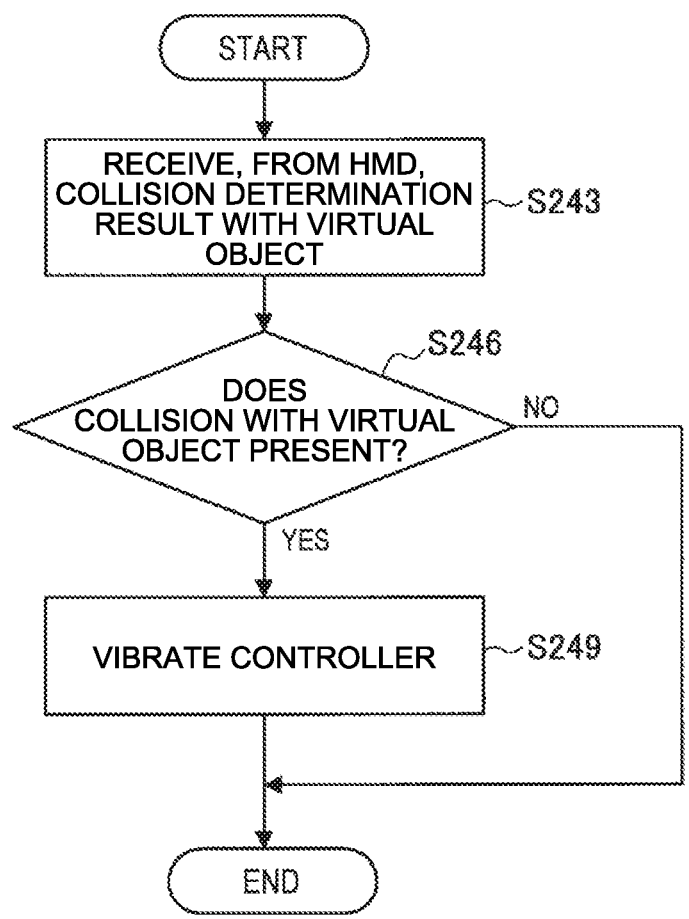
FIG. 9 is a flowchart illustrating one example of operation control according to information received from an HMD of a controller according to a fourth embodiment.

FIG. 9 is a flowchart illustrating one example of operation control according to information received from the HMD 20 of the controller 10 according to the present embodiment. As an example of information transmitted from the HMD 20 to the controller 10, there are supposed, for example, a controller position/dispersion, collision determination result with a virtual object, a distance to an obstacle, information of the HMD 20, and the like. Herein, a case will be explained as one example in which "collision determination result with virtual object" is transmitted from the HMD 20.

As illustrated in FIG. 9, the controller 10 receives, from the HMD 20, collision determination result with a virtual object (Step S243).

Next, when there presents a collision with a virtual object (Step S246: Yes), the controller 10 executes a process for vibrating the controller 10 (Step S249). Thus, a situation of a virtual space is able to correspond to the controller 10, so that it is possible to further increase sense of immersion into the virtual space.

Note that operation control of the controller 10 according to received information from the HMD 20 is not limited to the above-mentioned examples, and thus the controller 10 may be configured to start up the cameras 110 when disperse of a controller position estimated by the HMD 20 is large, for example. More specifically, for example, control is executed such that posture-sensor data alone is commonly transmitted from the controller 10 side to the HMD 20, and the controller 10 temporarily turns on the cameras 110, when the precision of a controller position estimated on the HMD 20 side has decreased, so as to transmit captured images, so that it is possible to reduce power consumption of the cameras 110.

When Exposure of the cameras 110 transmitted from the controller 10 results in being different from Exposure of the cameras 210 of the HMD 20, the controller 10 informs, by using vibration, a user of adjustment of Exposure or a blind state of the cameras 110.

4. SUPPLEMENT

As described above, the information processing system according to the present embodiment has been specifically explained. A system configuration according to the present embodiment is not limited to the configuration including the HMD 20 and the controller 10 illustrated in FIGS. 1 and 2, and may perform functions of the HMD 20 by using an external device (non-portable-type dedicated terminal, PC, smartphone, server, etc.), for example.

The external device has the functional configuration illustrated in FIG. 3 or 5, for example, and may perform estimation of a position (user position) of the HMD 20 and a position of the controller 10.

A display that presents, to a user, an image of a virtual space is not limited to a wearable device such as the HMD 20, and may be, for example, a smartphone, a PC, a TV device, a projector, or the like.

5. CONCLUSION

As has been described above, in accordance with the information processing system according to the embodiments of the present disclosure, it is possible to perform position estimation of the controller corresponding to a wearable device having an inside-out type.

While preferable embodiments of the present disclosure have been described above in detail with reference to the attached drawings, the technical scope of the present disclosure is not limited thereto. It is obvious that those skilled in the technical field of the present disclosure could have conceived of various changes or modifications within the scope of the technical ideas described in the claims, and it is understood that those changes or modifications also reasonably belong to the technical scope of the present disclosure.

In addition, it is also possible to create a computer program that allows hardware such as CPU, ROM, and RAM built in the above-mentioned HMD 20 or the controller 10 to exert functions equivalent to those in of the HMD 20 or the controller 10. Furthermore, a storage medium that stores therein the computer program can also be provided.

Furthermore, the effects described in the present specification are merely explanations or exemplifications, and are not limiting. In other words, the techniques according to the present disclosure may exert other effects that are obvious to those skilled in the art from the descriptions of the present specification, along with the above-described effects or instead of the above-described effects.

Additionally, the present technology may also be configured as below.

(1)

An information processing apparatus comprising:

a user-position estimating unit that recognizes, based on a first captured image that is captured by a first image capturing unit provided to a wearable device mounted on a user, peripheral environment information of the user to execute position estimation of the user in a real space; and a controller-position estimating unit that executes, based on a second captured image captured by a second image capturing unit that is provided to a controller being operated by the user, position estimation of the controller with reference to the recognized environment information.

(2)

The information processing apparatus according to (1), wherein the user-position estimating unit includes posture estimation of the user, and the controller-position estimating unit includes posture estimation of the controller.

(3)

The information processing apparatus according to (2), further comprising:

a mapping unit that generates, based on the first captured image, peripheral environment information of the user as an environment map; and a storage that stores therein the generated environment map.

(4)

The information processing apparatus according to (3), wherein the mapping unit further generates the environment map by using the second captured image.

(5)

The information processing apparatus according to (3) or (4), wherein the user-position estimating unit executes, based on the first captured image, a simultaneous localization and mapping (SLAM) for estimating a position of the user.

(6)

The information processing apparatus according to any one of (3) to (5), wherein the wearable device includes a head mounted display to be mounted on a head of the user, and the information processing apparatus further comprises:

a display controlling unit that performs control for causing the head mounted display to display a content image that is generated based on (i) an estimated position and an estimated posture of the user and (ii) an estimated position and an estimated posture of the controller.

(7)

The information processing apparatus according to (6), wherein the information processing apparatus is realized by the wearable device.

(8)

The information processing apparatus according to any one of (3) to (7), wherein when estimating a position of the controller based on a position of a feature point in the second captured image, the controller-position estimating unit narrows down a candidate point from the environment map, with reference to the environment map, in accordance with an orientation of the user.

(9)

The information processing apparatus according to any one of (1) to (8), wherein the controller-position estimating unit estimates a position and a posture of the controller further with reference to posture information detected by a posture sensor provided to the controller.

(10)

The information processing apparatus according to (9), wherein the posture sensor includes a gyro acceleration sensor.

(11)

The information processing apparatus according to (9) or (10), further comprising:

a position correcting unit that corrects, based on new posture information acquired again from the controller, the position and the posture of the controller that are estimated by the controller-position estimating unit.

(12)

The information processing apparatus according to any one of (1) to (11), wherein when gyro acceleration information alone is transmitted from the controller, the controller-position estimating unit estimates a position and a posture of the controller by using an Inertial Navigation System (INS).

(13)

The information processing apparatus according to any one of (1) to (12), wherein the information processing apparatus transmits, to the controller, estimated position information of the controller.

(14)

An information processing method allowing a processor to execute the following steps:

recognizing, based on a first captured image that is captured by a first image capturing unit provided to a wearable device mounted on a user, peripheral environment information of the user to execute position estimation of the user in a real space; and executing, based on a second captured image captured by a second image capturing unit that is provided to a controller being operated by the user, position estimation of the controller with reference to the recognized environment information.

(15)

A program allowing a computer to function as:

a user-position estimating unit that recognizes, based on a first captured image that is captured by a first image capturing unit provided to a wearable device mounted on a user, peripheral environment information of the user to execute position estimation of the user in a real space; and a controller-position estimating unit that executes, based on a second captured image captured by a second image capturing unit that is provided to a controller being operated by the user, position estimation of the controller with reference to the recognized environment information.

REFERENCE SIGNS LIST 10 controller
100 control unit
110 camera
120 posture sensor
130 communication unit
20 HMD
200 control unit
201 environment mapping unit
202 user-position estimating unit
203 controller-position estimating unit
204 content-display controlling unit
206 user-position correcting unit
207 controller-position correcting unit
210 camera
220 posture sensor
230 operation input unit
240 communication unit
250 display
260 sound outputting unit
270 storage
271 environment-map storage
272 content storage

The invention claimed is:

1. An information processing apparatus, comprising:
a user-position estimating unit configured to:
recognize, based on a first captured image that is captured by a first image capturing unit, peripheral environment information of a user, wherein
the first image capturing unit is in a wearable device mountable on a head of the user, and
the wearable device includes a head mounted display;
estimate a position of the user in a real space based on the recognized peripheral environment information; and
estimate a posture of the user;
a content display controlling unit configured to generate a content image based on the estimated position and the estimated posture of the user;
a controller-position estimating unit configured to estimate a position of a controller with reference to the recognized peripheral environment information of the user, wherein
the estimation of the position of the controller is based on:
a position of a feature point in a second captured image captured by a second image capturing unit, and
an orientation of the wearable device, and
the second image capturing unit is in the controller operated by the user; and
a display controlling unit configured to control the head mounted display to display the content image.

2. The information processing apparatus according to claim 1, wherein
the controller-position estimating unit is further configured to estimate a posture of the controller.

3. The information processing apparatus according to claim 2, further comprising a mapping unit configured to generate, based on the first captured image, the peripheral environment information of the user as an environment map, wherein the environment map is stored in a storage unit.

4. The information processing apparatus according to claim 3, wherein the mapping unit is further configured to generate the environment map based on the second captured image.

5. The information processing apparatus according to claim 3, wherein the user-position estimating unit is further configured to execute, based on the first captured image, a simultaneous localization and mapping (SLAM) to estimate the position of the user.

6. The information processing apparatus according to claim 3, wherein
the content display controlling unit is further configured to generate the content image based on the estimated position and the estimated posture of the controller.

7. The information processing apparatus according to claim 6, wherein the information processing apparatus is realized by the wearable device.

8. The information processing apparatus according to claim 1, wherein
the controller-position estimating unit is further configured to estimate the position and a posture of the controller with reference to first posture information detected by a posture sensor in the controller, and the first posture information is detected at a first time instant.

9. The information processing apparatus according to claim 8, wherein the posture sensor includes a gyro acceleration sensor.

10. The information processing apparatus according to claim 8, further comprising a position correcting unit configured to correct, based on second posture information acquired from the controller, the position and the posture of the controller, wherein the second posture information is detected at a second time instant different from the first time instant.

11. The information processing apparatus according to claim 1, wherein the controller-position estimating unit is further configured to estimate, based on gyro acceleration information transmitted from the controller and an Inertial Navigation System (INS), the position and a posture of the controller.

12. The information processing apparatus according to claim 1, further comprising a communication unit, configured to transmit, to the controller, information associated with the estimated position of the controller.

13. The information processing apparatus according to claim 1, wherein the controller-position estimating unit is further configured to:
receive posture data from the controller at a first time period for the estimation of the position of the controller; and
receive both the posture data and the second captured image at a second time period for the estimation of the position of the controller.

14. The information processing apparatus according to claim 1, further comprising a communication unit configured to transmit, to the controller, a collision determination result with a virtual object, wherein the collision determination result causes the controller to vibrate.

15. An information processing method, comprising:
recognizing, based on a first captured image that is captured by a first image capturing unit, peripheral environment information of a user, wherein
the first image capturing unit is in a wearable device mountable on a head of the user, and
the wearable device includes a head mounted display;
estimating a position of the user in a real space based on the recognized peripheral environment information;
estimating a posture of the user;
generating a content image based on the estimated position and the estimated posture of the user;
estimating a position of a controller with reference to the recognized peripheral environment information of the user, wherein
the estimation of the position of the controller is based on:
a position of a feature point in a second captured image captured by a second image capturing unit, and
an orientation of the wearable device, and
the second image capturing unit is in the controller operated by the user; and
controlling the head mounted display to display the content image.

16. A non-transitory computer-readable medium having stored thereon, computer-executable instructions, which when executed by a computer, cause the computer to execute operations, the operations comprising:
recognizing, based on a first captured image that is captured by a first image capturing unit, peripheral environment information of a user, wherein
the first image capturing unit is in a wearable device mountable on a head of the user, and
the wearable device includes a head mounted display;
estimating a position of the user in a real space based on the recognized peripheral environment information;
estimating a posture of the user;
generating a content image based on the estimated position and the estimated posture of the user;
estimating a position of a controller with reference to the recognized peripheral environment information of the user, wherein
the estimation of the position of the controller is based on:
a position of a feature point in a second captured image captured by a second image capturing unit, and
an orientation of the wearable device, and
the second image capturing unit is in the controller operated by the user; and
controlling the head mounted display to display the content image.

* * * * *